Patented Mar. 29, 1949

2,465,461

UNITED STATES PATENT OFFICE 2,465,461

SATURATED CYCLIC 2,1-AZATHIONIUM COMPOUNDS AND PROCESS FOR MAKING SAME

Theodore F. Lavine, Cynwyd, Pa., assignor to The Lankenau Hospital, Philadelphia, Pa., a corporation of Pennsylvania No Drawing. Application February 18, 1946, Serial No. 648,566

10 Claims. (Cl. 260—243)

This invention relates to new compositions of matter characterized by the presence of a sulfonium group in a monocyclic system and to a cyclization process for the production and isolation of such compositions from S-alkylated or S-aralkylated derivatives of gamma-mercaptopropylamine, and the homologs and substitution products thereof. Among such substitution products are the amino acid, methionine, and other S-alkylated or S-aralkylated derivatives of homocysteine. As a matter of terminology the compounds produced by the process of the present invention may be designated as cyclic 2,1-azathionium compounds and where used in this specification and the appended claims this term is intended to include both the six membered and five membered ring systems which may be designated specifically as azathionium and azathiolium compounds respectively.

As disclosed in U. S. Patents 2,049,480 and 2,078,592 it is possible to produce oxidation products of compounds such as cystine and its homologues such as homocystine. Following the process disclosed in these patents one obtains disulfoxides of the general formula

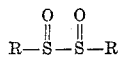

where R represents the radicals joined to the —S—S— group in cystine and its polypeptide derivatives. It is also known that oxidation of such compounds in an aqueous solution by means of oxidation agents such as bromine or iodine leads, in the case of cystine, to the formation of cysteic acid (J. Biol. Chem. 96, 285 (1932), 97, XXII (1932)). There are indications that the —S—S— linkage in such compounds is weakened by oxidation in aqueous solution to such an extent that the compound undergoes hydrolysis. The present invention relates to the oxidation of compounds that are similar to those discussed in the above mentioned patents but which differ in that their sulfur is present as a thio ether group. This class of compounds is referred to herein as S-alkylated or S-aralkylated gamma-methiopropylamine, homologs and substitution products. Oxidation products of such compounds prepared and isolated in accordance with the process of the present invention are characterized by the presence of a functional sulfonium group existing as a part of a cyclic ring hitherto unknown except in combination as for instance in a condensed system. The process is characterized by a ring closure likewise hitherto unknown.

The present invention has as one object the preparation and isolation of new ring compounds as described above. A further object is to provide a ring closure process for the formation and isolation of new cyclic compounds from S-alkylated and S-aralkylated derivatives of gamma-mercaptopropylamine, homologs and substitution products thereof.

The following examples will illustrate the steps involved in the oxidation, ring closure process of the present invention and will also make clear the nature of the new ring system which is formed by the practice of the process disclosed. Throughout this specification and the appended claims the terminology and numbering of the various ring compounds follow that employed in the Ring Index of the American Chemical Society published in 1940 as ACS monograph 84.

Example 1

Dilute solutions of the product of the present invention are prepared at room temperature by adding 1 ml. of 0.1 M iodine dissolved in methyl alcohol to 5 ml. of a solution 0.02 M in methionine and 0.04 M in NaOH. The reaction is completed almost at once as marked by disappearance of the iodine, and the HI that is formed is neutralized by the sodium hydroxide to form sodium iodide. The iodide may be replaced by nitrate, sulfate, perchlorate and the like by adding an equivalent amount of the appropriate silver salt (e. g. 4 ml. of 0.05 M AgNO₃ for the above example). The precipitate of silver iodide is removed by filtration or centrifugation leaving a solution containing the product and sodium nitrate (or sulfate, perchlorate, etc.) in substantially quantitative yield.

Example 2

For solutions in which the methionine is more concentrated than in Example 1, one-half the alkali may be added before the addition of iodine and the other half of the alkali added after. Thus 10 ml. of 0.5 M I₂ dissolved in methyl alcohol was added to 25 ml. of a solution 0.2 M in methionine and 0.2 M in KOH, after which 2 ml. of 2.5 M KOH was added. As in the case of Example 1 the iodide formed in the reaction was precipitated with a silver salt (50 ml. of 0.2 M AgClO₄) and the silver iodide thus formed was removed by centrifugation leaving a solution composed of the product and sodium perchlorate.

Example 3

For a solution of the product substantially free of extraneous matter the following process is followed employing a freshly prepared silver oxide solution in the iodine oxidation step. The silver oxide is first obtained from 11.8 mM of silver nitrate and 12.5 mM of sodium hydroxide in a volume of 50 ml. of water. Throughout this specification the abbreviation mM is used to designate millimols (i. e. the one-thousandth part of a gram molecule. This solution is centrifuged and washed twice by stirring with 50 ml. of water and re-centrifuging. 5 mM of methionine and 35 ml. of water are then added to the silver oxide thus formed, followed by 10 ml. of 0.5 M iodine in methyl alcohol. This mixture is stirred until neutral (pH 7)—a point marked by a sharp change in color of the precipitate from tan to white. The mixture is then centrifuged immediately. The clear liquid is decanted and its acidity is adjusted to pH 7 by the addition of 0.1N HCl dropwise. After filtering from the slight amount of silver chloride thus produced, the resulting solution is evaporated in a vacuum disiccator in the presence of $P_2O_5$ and the residue treated with 10 to 20 ml. of absolute methyl alcohol and filtered. Ethyl ether is then added until the solution is turbid. Crystallization is allowed to proceed until the turbidity disappears and the process of adding ether and crystallizing is continued until the addition of ether no longer produces turbidity. This may require a total of 5 volumes of ethyl ether. The yield in this example was 78% of theoretical.

*Example 4*

The product obtained in Example 3 after the removal of silver chloride by filtration or centrifugation was concentrated in vacuo by distillation in an atmosphere of nitrogen to 10 ml. and then taken to dryness in a vacuum desiccator containing $P_2O_5$ (the important point in the distillation both in the present example and in Example 3 is to exclude $CO_2$ which would make the solution sufficiently acidic for appreciable sulfoxide formation to take place). The dry residue remaining in the desiccator was extracted with 5 ml. and 7 ml. portions of absolute methyl alcohol, and then filtered. The desired product hereinafter described in detail was precipitated by three successive additions of 25 ml. of absolute ether. The yield in this example was 0.559 gms. or 76% of theoretical.

*Example 5*

One ml. of 0.05 M $I_2$ is added to one ml. of 0.05 M deltamethiobutylamine hydrochloride. The addition of two equivalents (0.10 mM) of 0.05 M NaOH causes the $I_2$ to disappear and leaves a colorless, neutral solution which possesses the properties, described below, characteristic of the product. The yield was 85 per cent of the theoretical, based on the amount of $I_2$ liberated on the addition of acidified KI. Similarly, in the case of a solution 0.004 M in deltamethiobutylamine, 0.01 M in $I_2$, 1 M in KI and NaOH the amount of $I_2$ that was consumed corresponded to formation of the desired product (i. e. 1.10 moles of $I_2$ per mole of deltamethiobutylamine were consumed in 5 minutes and this value was essentially unchanged after one hour at room temperature). A 97 per cent yield was indicated by the amount of $I_2$ liberated on the addition of acidified KI to the solution.

The methionine oxidation product produced in Examples 1 to 4 inclusive and isolated in Examples 3 and 4 is designated chemically as tetrahydro - 1 - methyl-2,1-azathiolium-3-carboxylate for which I have proposed the name "dehydromethionine" since it differs from methionine only by the loss of 2H-atoms. Its structural formula is as follows:

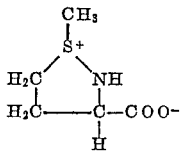

It will be noted that this compound has the ring structure of a tetrahydroisothiazole or iso- thiazolidine, hitherto unknown except in condensed systems, i. e. in combination with one or more other cyclic systems such as benzene. In addition dehydromethionine possesses a functional sulfonium group which, as far as I am aware, is unknown even in condensed systems.

The oxidation product produced in Example 5 is designated chemically as hexahydro-1-methyl-2,1-azathionium iodide having the structural formula:

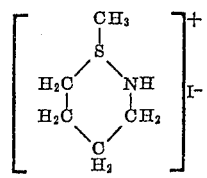

It should be noted that methionine exists as two optically active forms, d- and l-methionine, and also as an optically inactive racemic mixture, dl-methionine. The reaction process and ring closure of the present invention does not depend on the optical activity of the compound and the use of the word methionine is intended to include any of the three modifications. However, since the methionine molecule possesses an asymmetric C-atom, there will be a certain degree of asymmetric synthesis associated with formation of dehydromethionine since the sulfonium group constitutes a second center of asymmetry. This results in the formation of a mixture of diastereoisomers which have different physical properties so that the optical rotation, solubility, melting points, etc., of a preparation of dehydromethionine may vary depending on the degree of resolution effected by processes of crystallization, etc. No attempt was made to resolve dehydromethionine and, where necessary, the products will be distinguished by reference to the material of origin as dehydro-l-methionine or dehydro-dl-methionine.

Dehydro-l-methionine was found to crystallize under the conditions outlined above, using ether as a precipitating agent, in tufts or clusters of quill-shaped needles, often of large size. On heating, the crystals gradually darken, becoming very dark at about 180° C., shrink slightly at 205° C. and decompose with bubbling and gas evolution at 207–210° C. The crystals are quite hygroscopic and are readily soluble in methyl alcohol. Preliminary analysis indicates the following constituents:

| Analysis | C | H | N | S |
|---|---|---|---|---|
| Found (Average of two determinations) | 40.03 | 6.45 | 9.72 | 21.26 |
| Theory, $C_5H_9SNO_2$ | 40.81 | 6.17 | 9.52 | 21.79 |
| Discrepancies calculated as $H_2O$ | 1.93% $H_2O$ | 2.5% $H_2O$ | ------ | 1.79% $H_2O$ |

Dehydro-dl-methionine crystallizes in the form of rectangular plates or prisms with some tendency to cluster. It is less readily soluble in methyl alcohol than dehydro-l-methionine. On heating, it also gradually darkens becoming dark brown at 175° C., shrinks somewhat and melts with decomposition at 193–197° C. accompanied by bubbling and gas evolution.

Dehydromethionine is characterized by the following properties:

A. It acts as an oxidizing agent towards (1) acidified KI, setting free an equivalent amount of $I_2$ and regenerating methionine, (2) neutral cysteine, forming cystine and methionine, (3) neutral sodium bisulfite, forming sodium bisulfate and methionine.

B. It is stable against iodine at pH 7. Because of this property any excess iodine remaining after oxidation of methionine to dehydromethionine may be removed by such agents as sodium thiosulfate or sodium arsenite. In addition this property furnishes a point in the proof of structure since it indicates the presence of an "oxidized" sulfur atom.

C. It reacts with water extremely slowly at pH 7 and more rapidly as the acidity or alkalinity of the solution is increased, to form methoinine sulfoxide.

D. There is no formal titration associated with the compound (i. e. no increased acidity in the presence of formaldehyde) indicating the absence of $-NH_{3+}$ or $=NH_{2+}$ groups—which is a further point in proof of structure.

E. Dehydro-1-methionine possesses a specific molar rotation, $[M]_D^{26} = +84°$ to $90°$ for an 0.05 M solution in water. The fact that the optical activity of the asymmetric C-atom is not destroyed indicates that the valency structure of this atom is unaltered; i. e. no $=NH$ group or double bond involving this C-atom is present.

The structural essentials for the ring closure reaction of this invention are the location of a thio ether group and an amino group in a 1,5 or 1,6 position relative to each other. The description, therefore, should not be considered as restricting the reaction to methionine alone since the process and the ring formation thereof will be applicable to S-alkylated and S-aralkylated derivatives of gamma-mercaptopropylamine and its substitution products generally provided only that the substitution does not interfere with the oxidation process and the ring formation. The susceptibility of such substitutions to oxidation under the conditions involved will be apparent to those skilled in the art. Thus the terminal methyl group of methoinine may be replaced by any group or radical which does not impair the functional qualities of the sulfonium group. For instance S-benzylhomocysteine

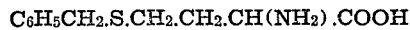

may be cyclized using the process of the present invention. The product thus formed is tetrahydro-1-benzyl-2,1-azathiolium-3-carboxylate.

The carboxyl group may be in the form of derivatives or it may be replaced by other elements, including H, or other groups. Substituents also may be present on the intervening C-atoms between S and N without interfering with the cyclization process of the present invention. The cyclization of delta-methiobutylamine as in Example 5 is an illustration of this although in this case a 6 membered ring containing a sulfonium group is produced.

The ease of formation of dehydromethionine under proper conditions and its stability at the neutral point suggest biological importance. The oxidizing powers of this compound and its reactivity with other compounds containing a sulfhydryl group provide the possibility of producing an autibiotic agent with bacteriostatic properties. Moreover, the ring closure process of the present invention provides a mechanism for the preparation of a whole series of compounds hitherto unknown.

While the present invention has been described in specific terms in the examples above it will be understood that the steps and compounds used may be varied considerably. For instance the iodine may be dissolved in alcohols other than methyl alcohol and the iodine used as an oxidizing agent may be replaced by other halogens such as bromine and other organic solvents than ether may be used as precipitating agents. Such variations are considered to be the equivalents of the compounds set forth in the following claims.

Having thus described my invention, I claim:

1. In a process for producing a cyclic 2,1-azathionium compound from a compound selected from the group consisting of methionine, deltamethiobutylamine and S-butylhomocysteine, the step which comprises oxidizing said selected compound with iodine in the presence of an alkali metal hydroxide.

2. The process of claim 1 characterized by the fact that the alkali metal hydroxide is sodium hydroxide.

3. A process for the production of a cyclic 2,1-azathionium compound from a compound selected from the group consisting of methionine, delta-methiobutylamine and S-benzylhomocysteine which comprises oxidizing said selected compound with iodine in the presence of sufficient sodium hydroxide to neutralize the hydrogen iodide formed in the oxidation process, thereby forming sodium iodide, precipitating the sodium iodide with a silver salt to form silver iodide and removing the silver iodide from the cyclic 2,1-azathionium compound thus formed.

4. A process for the production of a cyclic 2,1-azathionium compound from a compound selected from the group consisting of methionine, delta-methiobutylamine and S-benzylhomocysteine which comprises oxidizing said selected compound with iodine in the presence of silver oxide and removing the 2,1-azathionium compound from the precipitate thus formed.

5. A process for the production of tetrahydro-1-methyl-2,1-azathiolium-3-carboxylate from methionine which comprises oxidizing methionine with iodine in the presence of sodium hydroxide, precipitating the sodium iodide thus formed with silver nitrate and removing the silver iodide precipitate from the tetrahydro-1-methyl-2,1-azathiolium-3-carboxylate thus formed.

6. Tetrahydro-1-methyl-2,1-azathiolium-3-carboxylate.

7. A process for the production of hexahydro-1-methyl-2,1-azathionium iodide from delta-methiobutylamine which comprises oxidizing deltamethiobutylamine with iodide in the presence of sodium hydroxide, precipitating the sodium iodide thus formed with silver nitrate and removing the silver iodide precipitate from the hexahydro-1-methyl-2,1-azathionium iodide thus formed.

8. Hexahydro-1-methyl-2,1-azathionium iodide.

9. A process for the production of tetrahydro-1-benzyl-2,1-azathiolium-3-carboxylate from S-benzylhomocysteine which comprises oxidizing S-benzylhomocysteine with iodine in the presence of sodium hydroxide, precipitating the sodium iodide thus formed with silver nitrate and removing the silver iodide precipitate from the tetrahydro-1-benzyl-2,1-azathiolium-3-carboxylate thus formed.

10. Tetrahydro-1-benzyl-2,1-azathiolium-3-carboxylate.

THEODORE F. LAVINE.

No references cited.

Certificate of Correction

March 29, 1949.

Patent No. 2,465,461.

THEODORE F. LAVINE

It is hereby certified that errors appear in the printed specification of the above numbered patent requiring correction as follows:

Column 3, line 10, Example 3, for "disiccator" read *desiccator*; column 5, line 14, and line 43, same column, for "methoinine" read *methionine*; line 16, same column 5, for the word "formal" read *formol*; line 68, for "autibiotic" read *antibiotic*; column 6, line 14, for "butylhomocysteine" read *benzylhomocysteine*; line 54, claim 7, for "iodide" read *iodine*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*